United States Patent
Kaneko et al.

(10) Patent No.: US 9,244,468 B2
(45) Date of Patent: Jan. 26, 2016

(54) SMOOTHING DEVICE, SMOOTHING SYSTEM, AND COMPUTER PROGRAM PRODUCT

(71) Applicants: Yu Kaneko, Kanagawa-ken (JP); Shigeo Matsuzawa, Tokyo (JP)

(72) Inventors: Yu Kaneko, Kanagawa-ken (JP); Shigeo Matsuzawa, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 445 days.

(21) Appl. No.: 13/719,903

(22) Filed: Dec. 19, 2012

(65) Prior Publication Data

US 2013/0173067 A1    Jul. 4, 2013

(30) Foreign Application Priority Data

Dec. 28, 2011    (JP) ................................. 2011-288776

(51) Int. Cl.
| | |
|---|---|
| G05D 23/00 | (2006.01) |
| G05D 23/19 | (2006.01) |
| G06Q 50/06 | (2012.01) |
| G06Q 10/06 | (2012.01) |
| G06F 9/50 | (2006.01) |

(52) U.S. Cl.
CPC ............... *G05D 23/19* (2013.01); *G06F 9/505* (2013.01); *G06Q 10/0631* (2013.01); *G06Q 50/06* (2013.01); *G06F 2209/509* (2013.01); *Y02B 60/142* (2013.01)

(58) Field of Classification Search
None
See application file for complete search history.

(56) References Cited

U.S. PATENT DOCUMENTS

| | | | |
|---|---|---|---|
| 4,505,259 A * | 3/1985 | Seppanen et al. ............ | 126/586 |
| 4,916,909 A * | 4/1990 | Mathur et al. ................ | 62/59 |
| 5,902,183 A * | 5/1999 | D'Souza ....................... | 454/258 |
| 2004/0139038 A1* | 7/2004 | Ehlers et al. .................. | 705/412 |
| 2007/0227721 A1* | 10/2007 | Springer et al. .............. | 165/291 |
| 2009/0018705 A1* | 1/2009 | Ouchi et al. .................. | 700/291 |
| 2009/0234511 A1* | 9/2009 | Ouchi et al. .................. | 700/291 |
| 2010/0312396 A1* | 12/2010 | George .......................... | 700/278 |
| 2011/0184562 A1* | 7/2011 | Amundson et al. ........... | 700/276 |
| 2013/0013121 A1* | 1/2013 | Henze et al. .................. | 700/291 |
| 2013/0079978 A1* | 3/2013 | Uyeki ............................ | 701/36 |

FOREIGN PATENT DOCUMENTS

JP    2005-004676    1/2005

OTHER PUBLICATIONS

Sasaki et al, A Load Balancing Algorithm and a Node Deployment for a Cluster System to Handle Workload Changes, Information Processing Society of Japan (IPSJ) SIG Technical Reports, 2006-DSM-41 (5).

* cited by examiner

*Primary Examiner* — Darrin Dunn
*Assistant Examiner* — Christopher E Everett
(74) *Attorney, Agent, or Firm* — Amin, Turocy & Watson, LLP

(57) ABSTRACT

According to an embodiment, a smoothing device includes a predicting unit, a calculating unit, and a control unit. The predicting unit predicts a calculation load of operation at a first time slot on the basis of weather prediction information of operation areas in which facility devices that perform environmental control according to control values resulting from the operation based on weather information are installed. The calculating unit calculates a calculation load of operation at a second time slot earlier than the first time slot on the basis of the weather information of the operation areas. The control unit controls an executing device that executes the operation so that part of the operation to be executed at the first time slot is executed at the second time slot.

5 Claims, 10 Drawing Sheets

FIG.4A

| OPERATION AREA ID | FACILITY ID | WEATHER INFORMATION PROVIDING DEVICE INFORMATION |
|---|---|---|
|  |  |  |
|  |  |  |
|  |  |  |

FIG.4B

| FACILITY ID | CONTROL METHOD INFORMATION |
|---|---|
|  |  |
|  |  |
|  |  |

FIG.4C

| OPERATION TIME SLOT | OPERATION AREA ID |
|---|---|
|  |  |
|  |  |
|  |  |

FIG.8

| OPERATION EXECUTING TIME | WEATHER PREDICTION INFORMATION | CONTROL VALUE | FACILITY INFORMATION | ORIGINAL OPERATION EXECUTING TIME |
|---|---|---|---|---|
| | | | | |
| | | | | |

# SMOOTHING DEVICE, SMOOTHING SYSTEM, AND COMPUTER PROGRAM PRODUCT

CROSS-REFERENCE TO RELATED APPLICATION

This application is based upon and claims the benefit of priority from Japanese Patent Application No. 2011-288776, filed on Dec. 28, 2011; the entire contents of which are incorporated herein by reference.

FIELD

Embodiments disclosed herein relate generally to a smoothing device, a smoothing system, and a computer program product.

BACKGROUND

In recent years, remote energy saving services mainly targeted at buildings are provided. Remote energy saving services are services that provide power supply/demand control such as air conditioning control and lighting control to predetermined areas in buildings or the like through the Internet. Control values used for the power supply/demand control such as air conditioning control and lighting control are calculated by operation executing servers or the like and distributed to facility devices installed in the areas.

It is known to equalize the calculation load of the operation by distributing the operation over a plurality of executing devices such as servers. It is also known to attempt to reduce the calculation load by performing the operation of control values used for power supply/demand control according to weather information. Specifically, it is known to attempt to reduce the calculation load by performing the operation when the weather has greatly changed and not performing the operation when the change in the weather is small.

There are cases, where time slots at which a change in the weather is large and time slots at which a change in the weather is small overlap in a plurality of areas subjected to environmental control. Time slots with a high calculation load and time slots with a low calculation load therefore occur and it has been difficult to smooth the calculation load in the related art.

BRIEF DESCRIPTION OF THE DRAWINGS

FIGS. 4A to 4C are tables illustrating data structures of information to be stored in a first storage unit, a second storage unit and a third storage unit according to the first embodiment;

FIG. 8 is a table illustrating a data structure of information to be stored in a fourth storage unit according to the second embodiment;

DETAILED DESCRIPTION

According to an embodiment, a smoothing device includes a predicting unit, a calculating unit, and a control unit. The predicting unit predicts a calculation load of operation at a first time slot on the basis of weather prediction information of a plurality of operation areas. Facility devices that perform environmental control according to control values resulting from the operation based on weather information are installed in those operation areas. The calculating unit calculates a calculation load of operation at a second time slot earlier than the first time slot on the basis of the weather information of the operation areas. The control unit controls an operation executing server that executes the operation so that part of the operation to be executed at the first time slot is executed at the second time slot when the calculation load at the second time slot is smaller than a predetermined first threshold and the calculation load at the first time slot is equal to or larger than the first threshold.

Examples of a smoothing device, a smoothing system and a computer program product therefor according to embodiments will be described in detail below with reference to the accompanying drawings.

First Embodiment

Figure 1:
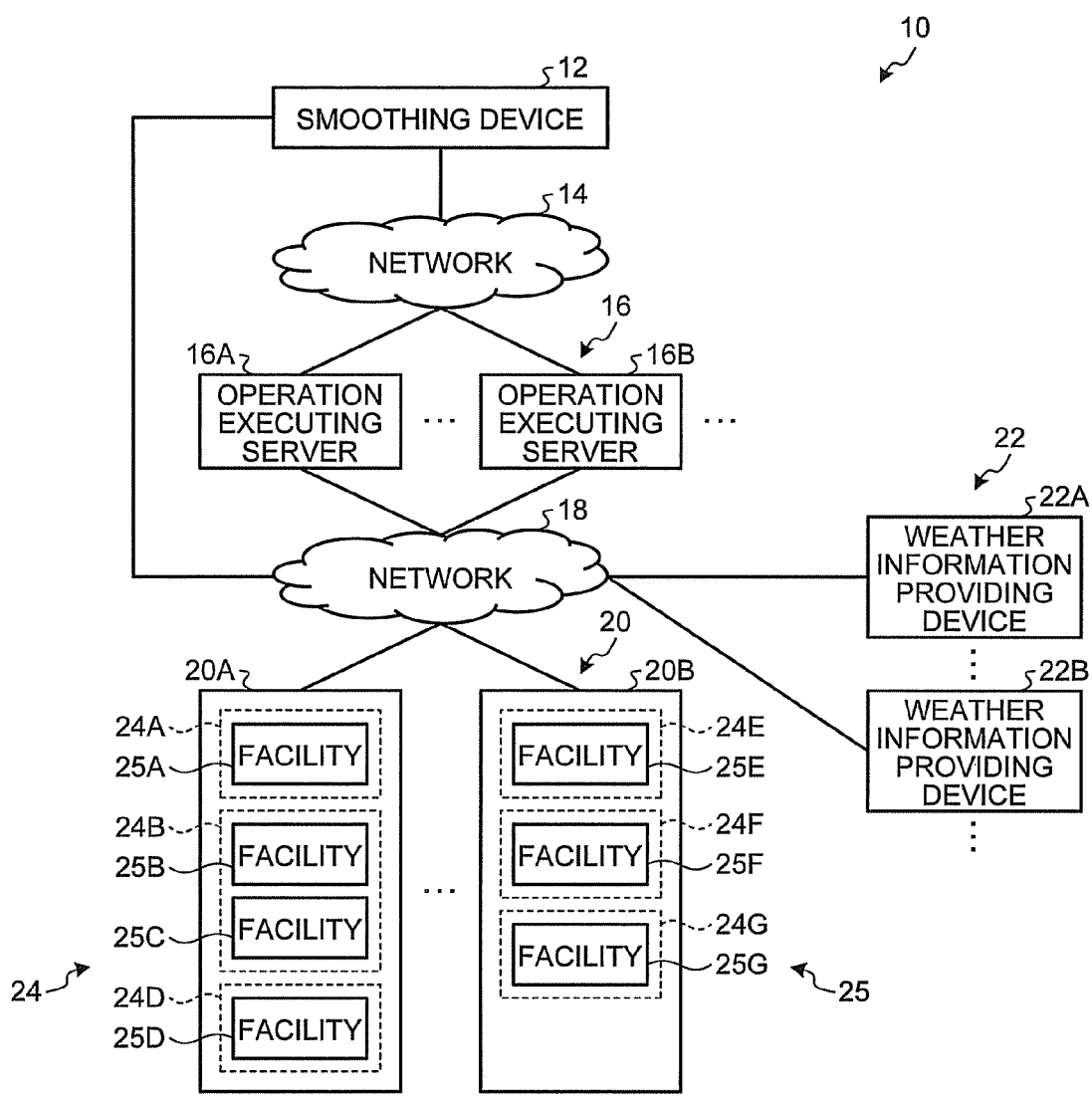
FIG. 1 is a diagram of a smoothing system according to a first embodiment.

FIG. 1 is a block diagram illustrating a network configuration of a smoothing system including a smoothing device according to the present embodiment.

A smoothing system 10 includes a smoothing device 12, operation executing servers 16, weather information providing devices 22 and facility devices 25. The smoothing device 12 and the operation executing servers 16 are connected via a network 14. The operation executing servers 16 and the facility devices 25 are connected via a network 18. The weather information providing devices 22 and the smoothing device 12 are also connected via the network 18.

The smoothing device 12 is connected with the operation executing servers 16 and the weather information providing devices 22 via the network 14 and the network 18. The operation executing servers 16 are connected with the facility devices 25 via the network 18.

The network 14 and the network 18 are known communication lines. The network 14 and the network 18 may be wired communication networks or wireless communication networks. The network 14 is, for example, a local area network (LAN) and employs communication protocols such as Ethernet (registered trademark) and TCP/IP. The network 18 is, for example, the Internet and employs communication protocols such as Ethernet (registered trademark) and TCP/IP. The network 14 and the network 18 may be one network.

The facility devices 25 perform environmental control in areas in which the facility devices 25 are installed. The environment refers to, but is not limited to, the temperature, the humidity, the illuminance of lighting and the like of each area. Specifically, the facility devices 25 control air conditioning such as the temperature and the humidity, lighting such as the illuminance and the like to control the environment of the areas in which the facility devices 25 are installed. Examples of the facility devices 25 include, but are not limited to, known heating and cooling devices, humidity controlling devices, lighting devices and combinations thereof.

The facility devices 25 include a plurality of facility devices 25A to 25G. These facility devices 25A to 25G will be referred to as the facility devices 25 when the facility devices are described collectively. The facility devices 25 are installed in areas subjected to environmental control in the smoothing system 10. Specifically, the facility devices 25 are installed in respective areas for which the operation executing servers 16 calculate the control values. The control values are values to be used for controlling the facility devices 25. Specifically, the control values are values to be used for control when the facility devices 25 control the environment. The control values are calculated by operation based on weather information executed by the operation executing servers 16 (details of which will be described later). Examples of the control values include temperature information used for temperature control, humidity information used for humidity control and brightness information used for lighting control.

In the present embodiment, the areas in which the facility devices 25 are installed will be referred to as operation areas 24 in the description. The operation areas 24 are areas (spaces) subjected to environmental control in the smoothing system 10. The facility devices 25 are each installed in each of the operation areas 24 into which the area subjected to environmental control in the smoothing system 10 is divided. In the example illustrated in FIG. 1, the facility devices 25 are each installed in each of the areas corresponding to one or more operation areas 24 into which the inside of buildings 20 such as buildings 20A and 20B is divided. In the example illustrated in FIG. 1, one or more facility devices 25 are installed in each of operation areas 24A, 24B, and 24D to 24G. The operation areas 24 are assigned with specific spaces such as conference rooms, corridors and private rooms. The operation areas 24 in which the facility devices 25 are installed, however, are not limited to inside of the buildings 20. The number of facility devices 25 installed in each operation area 24 is not limited to one but a plurality of facility devices 25 may be installed in one operation area 24. The operation areas 24A, 24B, and 24D to 24G will be collectively referred to as the operation areas 24 in the description.

Examples of the buildings 20 include buildings, houses, apartments and factories. While a case in which the operation areas 24 refer to areas in the buildings 20 will be described in the present embodiment, the operation areas 24 are not limited to the buildings 20.

The operation executing servers 16 include a plurality of operation executing servers 16A and 16B. The operation executing servers 16A and 16B will be collectively referred to as the operation executing servers 16. The operation executing servers 16 execute operation to perform energy saving services and calculate control values for the facility devices 25 installed in the operation areas 24. The energy saving services refer to provision of services relating to energy saving to predetermined operation areas 24 via the Internet. Examples of the energy saving services include comfortable air conditioning control and comfortable lighting control. The comfortable air conditioning control is a service that realizes energy saving while maintaining human comfort by determining the preset temperature of air conditioning taking the temperature and the humidity into account. The comfortable lighting control is a service that realizes energy saving while maintaining human comfort by determining the illuminance of lighting taking the solar radiation and the temperature into account.

The operation executing servers 16 receive operation information of each facility device 25 installed in each operation area 24 subjected to operation of the control values from the smoothing device 12. The operation information is information to be used for operation of control values at the operation executing servers 16. The operation information includes weather information (temperature, humidity, wind speed, solar radiation, etc.) at a certain operation time slot (time period).

The operation time slot refers to a time slot at which the operation executing servers 16 should perform operation of control values for the operation areas 24. Predetermined constant values may be used for the operation time slots. Examples of the operation time slots include periods of several minutes, 10 minutes, 20 minutes, etc.

Upon receipt of the operation information, the operation executing servers 16 execute operation for calculating control values on the basis of the received operation information. The operation hereinafter refers to operation of control values at the operation executing servers 16. The operation executing servers 16 transmit the calculated control values to the facility devices 25 installed in the operation areas 24 in which environmental control is to be performed by using the control values.

Upon receipt of the control values, the facility devices 25 control the environment such as the humidity, the temperature and the intensity of lighting by using the received control values.

The weather information providing devices 22 include a plurality of weather information providing devices 22A and 22B. These weather information providing devices 22A and 22B will be collectively referred to as the weather information providing devices 22. The smoothing system 10 only needs to include one weather information providing device 22 and is not limited to a configuration including a plurality of weather information providing devices 22.

The weather information providing devices 22 are devices that provide current weather information of the operation areas 24. The weather information includes the temperature, the humidity, the solar radiation, the wind speed, the wind direction, the amount of rainfall, the amount of snowfall, etc. Examples of the weather information providing devices 22 include known servers that provide known weather information distribution services.

The smoothing device 12 halts the operation of control values for some operation areas 24 at an operation time slot at which the calculation load of the operation of control values (hereinafter may be simply referred to as operation) on the basis of the weather information acquired from the weather information providing devices 22. In this manner, the smoothing device 12 according to the present embodiment smoothes the calculation load of the operation.

A state in which the weather of the operation areas 24 has not changed to such an extent that the operation is to be executed will be assumed here. In this case, in the related art, the calculation load of the operation on the operation executing servers 16 is smoothed by not performing the operation of control values to be used at the facility devices 25.

Figure 2:
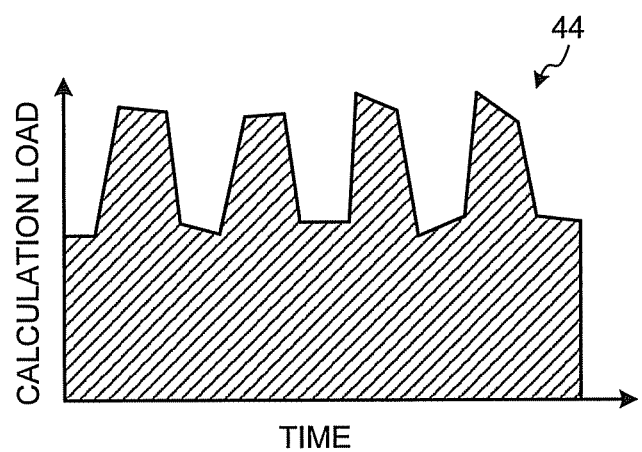
FIG. 2 is a graph illustrating a relation between time and the calculation load.

There may be cases, however, where time slots at which the weather change is large in the operation areas 24 and time slots at which the weather change is small in the operation areas 24 overlap with one another. In other words, considering all the operation areas 24 subjected to environmental control in the smoothing system 10, the calculation load changes with time elapsed. FIG. 2 is a graph illustrating the relation between time and the calculation load in the related art. As illustrated by a graph 44 in FIG. 2, changes of the calculation load with time elapsed occur in the related art. It is thus difficult to smooth the changes in the calculation load with time elapsed by simply halting the operation for the operation areas 24 in which the weather has not changed as in the related art.

The smoothing device 12 according to the present embodiment therefore executes part (first operation) of the operation to be executed at a future time slot with a high calculation load in advance at a time slot with a low calculation load. In this manner, the changes in the calculation load with time elapsed can be smoothed in the present embodiment.

The smoothing system 10 according to the present embodiment will be described in more detail.

Figure 3:
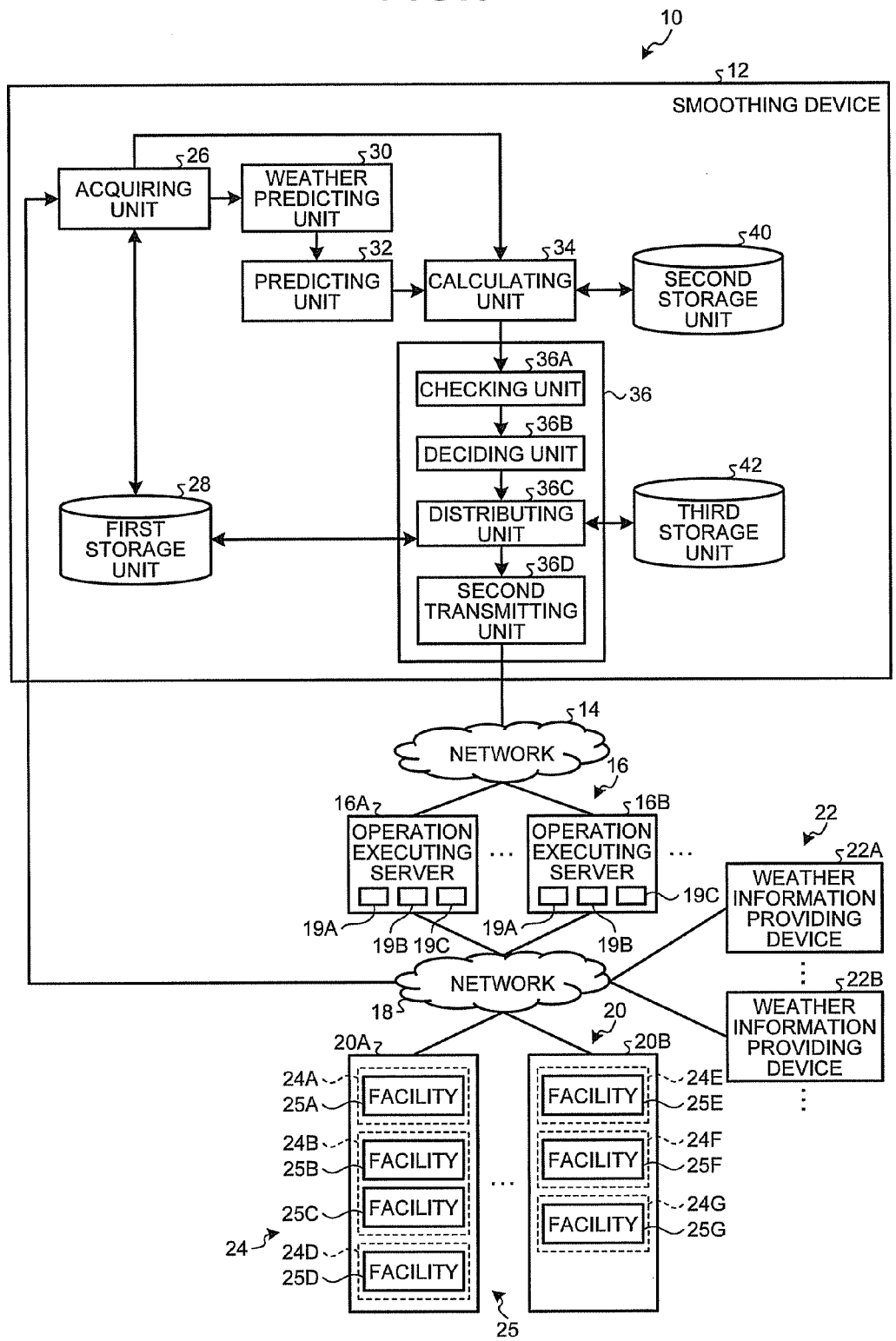
FIG. 3 is a block diagram illustrating the smoothing system according to the first embodiment.

FIG. 3 is a block diagram illustrating the smoothing system 10 in detail. The smoothing device 12 includes an acquiring unit 26, a first storage unit 28, a weather predicting unit 30, a predicting unit 32, a calculating unit 34, a control unit 36, a second storage unit 40 and a third storage unit 42.

The first storage unit 28 is a storage medium such as a hard disk drive (HDD). The first storage unit 28 stores information indicating all the operation areas 24 subjected to environmental control in the smoothing system 10. FIG. 4A is a table illustrating an example of a data structure of the information indicating the operation areas 24 stored in the first storage unit 28. As illustrated in FIG. 4A, the first storage unit 28 stores an operation area ID, a facility ID and weather information providing device information in association with one another.

The operation area ID is information that uniquely identifies the operation area 24 to be controlled in the smoothing system 10. The facility ID is information that uniquely identifies the facility device 25 installed in the operation area 24. The weather information providing device information is identification information of the weather information providing device 22. Specific examples of the weather information providing device information include an IP address of the weather information providing device 22, a service port number of the weather information providing device 22, a service URL of the weather information providing device 22 and a message format to be received from the weather information providing device 22.

The second storage unit 40 is a storage medium such as a hard disk drive (HDD). FIG. 4C is a table illustrating an example of a data structure of information stored in the second storage unit 40. As illustrated in FIG. 4C, the second storage unit 40 stores an operation area ID that uniquely identifies the operation area 24 determined to be the operation area for which the operation of control values is to be executed in advance, and a future original operation time slot representing a future operation executing time at which the operation of the control values is originally scheduled to be executed in association with one another.

The third storage unit 42 is a storage medium such as a hard disk drive (HDD). The third storage unit 42 stores information on the facility device 25 for which the operated control values are to be set. FIG. 4B illustrates an example of a data structure of the information on the facility device 25 stored in the third storage unit 42. As illustrated in FIG. 4B, the third storage unit 42 stores a facility ID and control method information in association with one another.

The control method information is information indicating a control method for the facility device 25 identified by the facility ID. Examples of the information indicating a control method for the facility device 25 include an IP address of the facility device 25, an IP address assigned to each building 20 in which the facility device 25 is installed, a service port number of the facility device 25, and a message format of the facility device 25.

The description refers back to FIG. 3 in which the acquiring unit 26 acquires weather information of the operation areas 24 from the weather information providing devices 22. Specifically, the acquiring unit 26 reads the weather information providing device information and the operation area ID associated with each weather information providing device 22 stored in the first storage unit 28 from the first storage unit 28. The acquiring unit 26 then obtains the operation areas 24 indicated by the weather information acquired from the weather information providing devices 22 and outputs the operation areas 24 together with the acquired weather information to the weather predicting unit 30.

The weather predicting unit 30 receives the weather information of the operation areas 24 from the weather information providing devices 22. The weather predicting unit 30 then calculates weather prediction information that is future weather information from past and current weather information received from the weather information providing device 22 for each operation area 24. The weather predicting unit 30 may calculate the weather prediction information by using a known weather prediction method.

In the present embodiment, a case where the acquiring unit 26 acquires weather information from the weather information providing devices 22 and the weather predicting unit 30 calculates weather prediction information on the basis of the acquired weather information will be described. The weather prediction information of the operation areas 24, however, may be acquired from known external devices that provide weather prediction information based on weather information via the network 18.

The predicting unit 32 predicts the calculation load of the operation at a future operation time slot (first time slot) on the basis of the weather prediction information calculated by the weather predicting unit 30.

Note that the calculation load of the operation at an operation time slot is proportional to the number of operation areas 24 for which operation of control values is executed at the operation time slot. In the present embodiment, therefore, the predicting unit 32 calculates operation areas 24 (operation executing areas) for which operation of control values is to be executed at a future operation time slot and the number R of operation areas that is the number of the operation executing areas. In this manner, the predicting unit 32 predicts the calculation load of operation at a future operation time slot.

The operation areas 24 for which operation is to be executed are operation areas 24 in which the change in the weather is large and for which operation thus needs to be executed. A large change in the weather refers to a change in the weather larger than a threshold T1. The threshold T1 may be determined in advance. The change in the weather can be obtained by calculating a difference between a value representing the weather at an operation time slot at which operation is to be executed and a value representing the weather at an operation time slot adjacent to and before the operation time slot. The value representing the weather is a value indicated by weather information and weather prediction information and obtained by quantifying the temperature, the humidity, the wind speed and the like.

The range of prediction by the predicting unit 32 and the range of weather prediction by the weather predicting unit 30 are set in advance. For example, the predicting unit 32 and the weather predicting unit 30 may predict weather prediction information and operation executing areas for one week and the number of operation executing areas every 10 minutes.

The calculating unit 34 calculates the calculation load of operation at a current operation time slot (second time slot). Specifically, the calculating unit 34 calculates the calculation load of the operation at the current operation time slot by calculating the number of operation areas 24 (hereinafter referred to as the number M of operation executing areas) for which operation is to be performed at the current operation time slot. The current operation time slot is a time slot earlier than the first time slot that is a future operation time slot.

The calculating unit 34 subtracts the number of operation areas 24 (hereinafter referred to as the number Q of operation areas) for which operation has already been executed in advance from the number of operation areas 24 (hereinafter referred to as the number P of operation areas) for which operation is to be executed at the current operation time slot. Using this subtraction, the calculating unit 34 calculates the number M of the operation executing areas for which operation is to be performed at the current operation time slot.

The calculating unit 34 first obtains current weather information from the acquiring unit 26, and calculates an amount of change in the weather at the current operation time slot. The calculating unit 34 calculates a difference between the weather information (past weather information) used at a previous calculation and the weather information (current weather information) now obtained from the acquiring unit 26 as the amount of change in the weather.

The calculating unit 34 then determines operation areas 24 in which the amount of change in the weather exceeds the threshold T1 as operation areas 24 for which operation is to be executed at the current operation time slot. The calculating unit 34 calculates the number of determined operation areas 24 to obtain the number P of operation areas.

The calculating unit 34 also calculates the number of operation areas 24 identified by operation IDs associated with the current operation time slot stored in the second storage unit 40 among the operation areas 24 for which operation is to be executed at the current operation time slot. In this manner, the calculating unit 34 calculates the number Q of operation areas for which operation has already been executed in advance from the number among the operation areas 24 for which operation is to be performed at the current operation time slot.

The calculating unit 34 then subtracts the number Q of operation areas 24 for which operation has already been executed in advance from the number P of operation areas 24 for which operation is to be executed at the current operation time slot to obtain the number M of operation areas. Using this calculation of the number M of operation executing areas, the calculating unit 34 calculates the calculation load of the operation at the current operation time slot.

The control unit 36 performs control so that part (first operation) of the operation to be executed at the future time slot (first time slot) is executed at the current operation time slot (second time slot) when the calculation load of the operation at the current operation time slot is smaller than a predetermined threshold T2 (first threshold) and the calculation load of the operation at the future operation time slot is equal to or larger than the predetermined threshold T2.

More specifically, the control unit 36 includes a checking unit 36A, a deciding unit 36B, a distributing unit 36C and a second transmitting unit 36D.

The checking unit 36A determines whether or not the calculation load at the current operation time slot calculated by the calculating unit 34 is smaller than the threshold T2 (the calculation load is low). The checking unit 36A also determines whether or not the calculation load at the future time slot predicted by the predicting unit 32 is equal to or larger than the threshold T2 (the calculation load is high).

The deciding unit 36B determines part of the operation at the future operation time slot as the first operation to be executed at the current operation time slot if the calculation load at the current time slot is smaller than the threshold T2 and if the calculation load at the future operation time slot is equal to or larger than the threshold T2 on the basis of the determination by the checking unit 36A. Specifically, the deciding unit 36B selects one or more of the operation areas 24 for which operation is to be executed at a time slot (the current operation time slot) earlier than the time (the future operation time slot) at which the operation is originally scheduled. In this manner, the deciding unit 36B determines part of the operation at the future operation time slot as the operation (the first operation) to be executed at the current operation time slot.

In other words, the deciding unit 36B determines one or more of the operation areas 24 for which operation is scheduled at the future operation time slot as the operation areas 24 for which operation is to be executed in advance at the current operation time slot so that the calculation load of the operation at the current operation time slot and the calculation load of the operation at the future operation time slot become the predetermined threshold T2.

The number of operation areas 24 determined by the deciding unit 36B is a value (T2−N) equal to or larger than 1 obtained by subtracting N from the threshold T2 (N is an integer equal to or larger than 1 and smaller than T2). Examples of the method for determining the operation areas 24 by the deciding unit 36B include a method of determination in a random manner and a method of determining operation areas in ascending order of time difference from the current operation time slot.

The deciding unit 36B then stores operation area IDs of the operation areas 24 for which operation is to be executed in advance and the future operation time slot at which the operation is originally scheduled in association with one another in the second storage unit 40.

The distributing unit 36C determines a distribution method by which operation information to be used for operation of control values to the operation executing servers 16. A known distribution method may be used for the method for distributing the operation information. For example, the distributing unit 36C may distribute the operation information evenly over a plurality of operation executing servers 16. Alternatively, the distributing unit 36C may weight the operation executing servers 16 according to operational conditions thereof and distribute a larger amount of operation information to the corresponding operation executing server 16 under a lower operational condition. Examples of the operational condition of the operation executing server 16 include the CPU usage in the operation executing server 16, the memory consumption in the operation executing server 16, and the network traffic of the operation executing server 16. Still alternatively, the distributing unit 36C may assign the operation information to the operation executing servers 16 with a slope at random. Still alternatively, the distributing unit 36C may weight the operation executing servers 16 taking the performance thereof into account and distribute the operation information according to the weighting.

The second transmitting unit 36D transmits the operation information containing second information and first information to the associated operation executing servers 16 to which the information is distributed by the distributing unit 36C at a time slot corresponding to the current operation time slot. The second information is operation information containing weather information of the current operation time slot. The first information is operation information containing weather prediction information of the future operation time slot.

Each operation executing server 16 includes a receiving unit 19A, a calculating unit 19B and an output unit 19C.

The receiving unit 19A receives the operation information containing the first information and the second information from the smoothing device 12. The calculating unit 19B executes operation on the basis of the first information and the second information contained in the received operation information to calculate control values to be used at the facility devices 25 installed in the operation areas 24 subjected to environmental control.

The output unit 19C transmits the control values resulting from the operation to the facility devices 25 at the current operation time slot.

Figure 5:
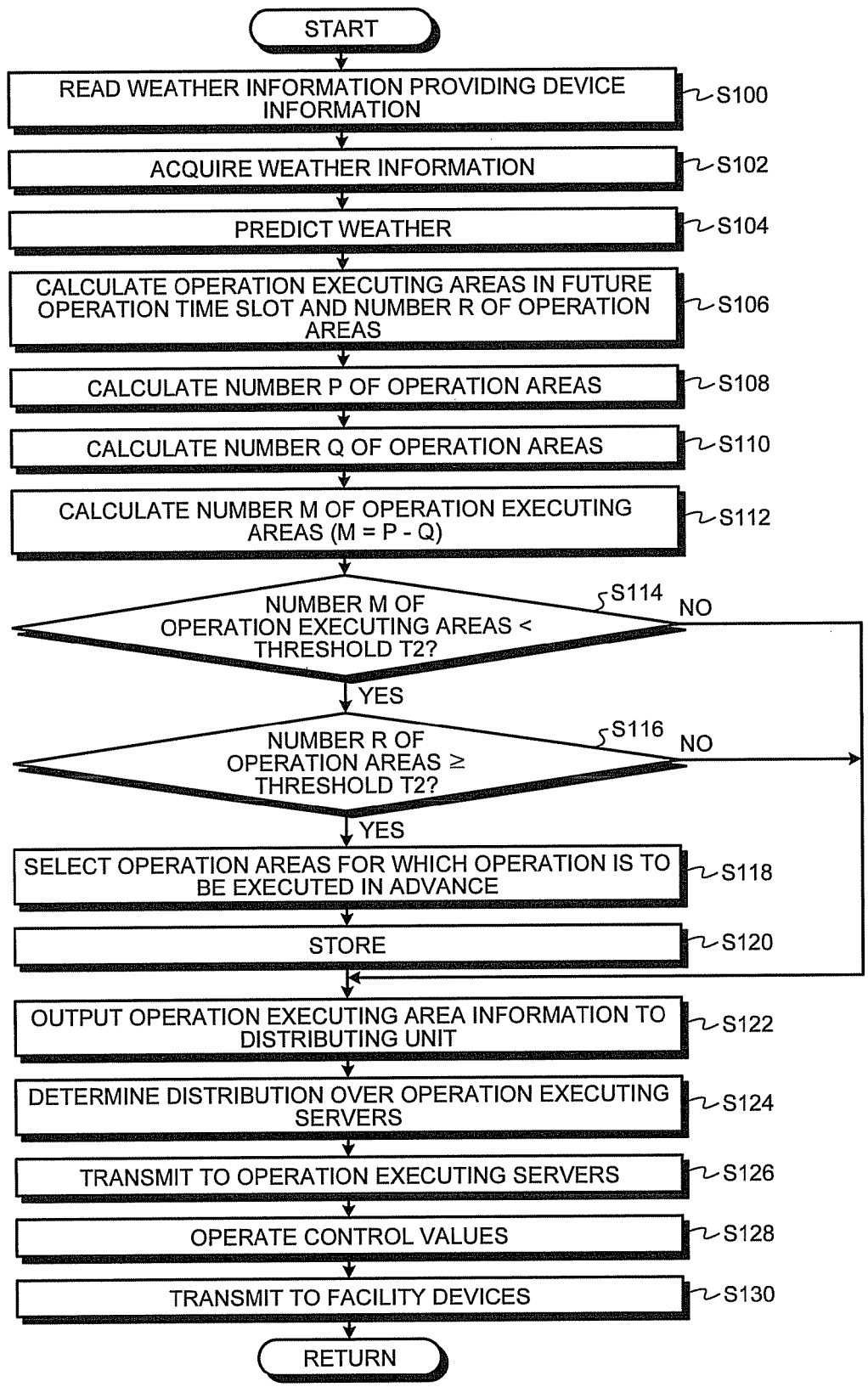
FIG. 5 is a flowchart illustrating procedures of a smoothing process according to the first embodiment.

Next, a smoothing process performed by the smoothing system 10 according to the present embodiment will be described. FIG. 5 is a flowchart illustrating procedures of the smoothing process according to the present embodiment.

In the smoothing system 10, the smoothing process illustrated in FIG. 5 is repeated at predetermined intervals. While a case in which the smoothing process is repeated at 10-minute intervals will be described in the present invention, the repetition is not limited to 10-minute intervals.

First, the acquiring unit 26 reads weather information providing device information from the first storage unit 28 (step S100). As a result of the process in step S100, the acquiring unit 26 acquires weather information providing information of the weather information providing devices 22 that provide weather information of all the operation areas 24 subjected to environmental control in the smoothing system 10.

The acquiring unit 26 then acquires weather information of the operation areas 24 identified by operation area IDs associated with the read weather information providing device information from the weather information providing devices 22 on the basis of the weather information providing device information read in step S100 (step S102). As a result of the process in step S102, the acquiring unit 26 acquires weather information of all the operation areas 24 subjected to environmental control in the smoothing system 10.

Next, the weather predicting unit 30 predicts the weather at a future operation time slot on the basis of the weather information of the operation areas 24 acquired by the acquiring unit 26 (step S104). As a result of the process in step S104, the weather predicting unit 30 predicts the weather prediction information of the operation areas 24.

Next, the predicting unit 32 calculates operation areas 24 (operation executing areas) for which operation of control values is to be executed at the future operation time slot and the number R of operation areas that is the number of the operation executing areas (step S106).

Next, the calculating unit 34 calculates the number P of operation areas 24 for which operation is to be executed at the current operation time slot on the basis of the weather information of the operation areas 24 acquired by the acquiring unit 26 (step S108).

The calculating unit 34 then calculates the number Q of operation areas for which operation has already been executed among the operation areas 24 for which operation is to be executed at the current operation time slot (step S110). The calculating unit 34 then calculates the number M of operation areas for which operation is to be executed at the current operation time slot (step S112). More specifically, the calculating unit 34 calculates a value obtained by subtracting the number Q of operation areas calculated in step S110 from the number P of operation areas calculated in step S108 as the number M of operation executing areas.

As a result of the processes in steps S108 to S112, the calculating unit 34 calculates the calculation load of the operation on the operation executing servers 16 at the current operation time slot.

Next, the checking unit 36A determines whether or not the number M of operation executing areas M at the current operation time slot calculated in step S112 is smaller than the predetermined threshold T2 (step S114). As a result of the determination in step S114, the checking unit 36A determines whether or not the calculation load of the operation on the operation executing servers 16 at the current operation time slot is low.

If the determination in step S114 is positive (Yes in step S114), the process proceeds to step S116. If the determination in step S114 is negative (No in step S114), however, the process proceeds to step S122 which will be described later.

In step S116, the checking unit 36A determines whether or not the number R of operation areas 24 for which operation is to be executed at the future operation time slot is equal to or larger than the threshold T2 (step S116). As a result of the determination in step S116, the checking unit 36A determines whether or not the calculation load of the operation on the operation executing server 16 at the future operation time slot is high.

If the determination in step S116 is positive (Yes in step S116), the process proceeds to step S118. If the determination in step S116 is negative (No in step S116), however, the process proceeds to step S122 which will be described later.

In step S118, the deciding unit 36B selects the operation areas 24, the number of which is larger than the threshold T1, from areas for which operation is to be executed at the future operation time slot predicted by the predicting unit 32 (step S118). As a result of the process in step S118, the deciding unit 36B determines part of the operation at the future operation time slot as the first operation to be executed at the current operation time slot.

Next, the deciding unit 36B stores the operation area IDs of the operation areas 24 determined in step S118, the future operation time slot at which the operation is originally scheduled in association with one another in the second storage unit 40 (step S120).

The deciding unit 36B then outputs operation executing area information indicating the operation areas 24 counted to the number M of operation executing areas in step S112 and operation executing area information indicating the operation areas 24 associated with the operation to be executed in advance selected in step S118 to the distributing unit 36C (step S122).

The distributing unit 36C that has received the operation executing area information determines distribution of operation information to be transmitted to the facility devices 25 installed in the respective operation areas 24 indicated by the received operation executing area information over the operation executing servers 16 (step S124).

In step S124, the distributing unit 36C reads facility IDs associated with the operation area IDs of the operation areas 24 indicated by the received operation executing area information from the first storage unit 28. The distributing unit 36C then reads control method information for the facility devices 25 associated with the read facility IDs from the third storage unit 42. The distributing unit 36C then determines distribution of the operation information on the basis of the read information.

Next, the second transmitting unit 36D transmits operation information containing: information indicating the operation areas 24; weather prediction information (first information) at the future operation time slot or weather information (second information) at the current operation time slot associated with the information indicating the operation areas 24; facility information indicating the facility devices 25 to which control values are to be transmitted; time at which environmental control according to the control values is to be performed; and the like, to the associated operation executing servers 16 determined by the distributing unit 36C based on the distribution result determined by the distributing unit 36C (step S126).

The time at which environmental control according to the control values to be performed is the original operation executing time. The original operation executing time refers to time at which the operation of control values is scheduled, that is, the original future operation time slot. Note that the operation executing time of operation for operation areas 24 that is not to be executed in advance is the current operation time slot.

The operation executing servers 16 that have received the operation information execute operation of control values on the basis of the received operation information (step S128). The operation executing servers 16 then transmit control values resulting from the operation, the original operation executing time contained in the operation information to the facility devices 25 in the associated operation areas 24 (step S130) and terminates the routine.

The facility devices 25 that have received the control values and the original operation executing time perform environmental control using the control values at the operation executing time.

As described above, in the smoothing system 10 according to the present embodiment, the operation executing servers 16 are controlled so that part of operation to be executed at the first time slot is executed at the second time slot when the calculation load of the operation at the first time slot that is a future operation time slot is equal to or larger than the first threshold (threshold T2) and the calculation load of the operation at the second time slot that is the current operation time slot is smaller than the first threshold (threshold T2) on the basis of weather prediction information.

Figure 6:
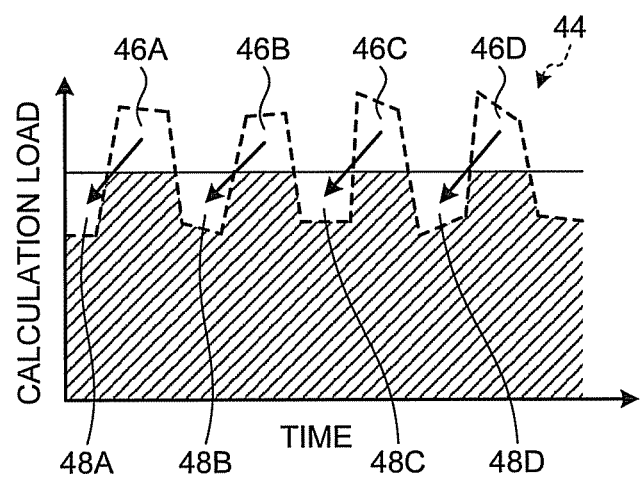
FIG. 6 is a graph illustrating smoothing of the calculation load according to the first embodiment.

FIG. 6 is a graph illustrating smoothing of the calculation load by the smoothing system 10 according to the present embodiment. As illustrated in FIG. 6, the smoothing system 10 can execute operation processes 46A to 46D that are part of operation to be executed at time slots at which the calculation load of the operation is high at time slots 48A to 48D with a low calculation load by performing the smoothing process described above.

The smoothing system 10 according to the present embodiment can therefore smooth changes in the calculation load of operation and thus effectively smooth the calculation load.

Furthermore, in the smoothing system 10 according to the present embodiment, the operation executing servers 16 transmits control values calculated by operation to the associated facility devices 25 at the second time slot that is the current operation time slot. Since the operation executing servers 16 also transmit the control values resulting from operation in advance immediately to the associated facility devices 25 in this manner, the load on the operation executing servers 16 can further be reduced.

Second Embodiment

In the first embodiment, a case in which the operation executing servers 16 calculate control values for the facility devices 25 and immediately transmit the control values to the associated facility devices 25 upon receipt of operation information from the smoothing device 12 is described. In the present embodiment, control values for the facility devices 25 calculated by the operation executing servers 16 are once stored at the smoothing device 12 and transmitted to the facility devices 25 when time at which environmental control according to the control values is reached.

Figure 7:
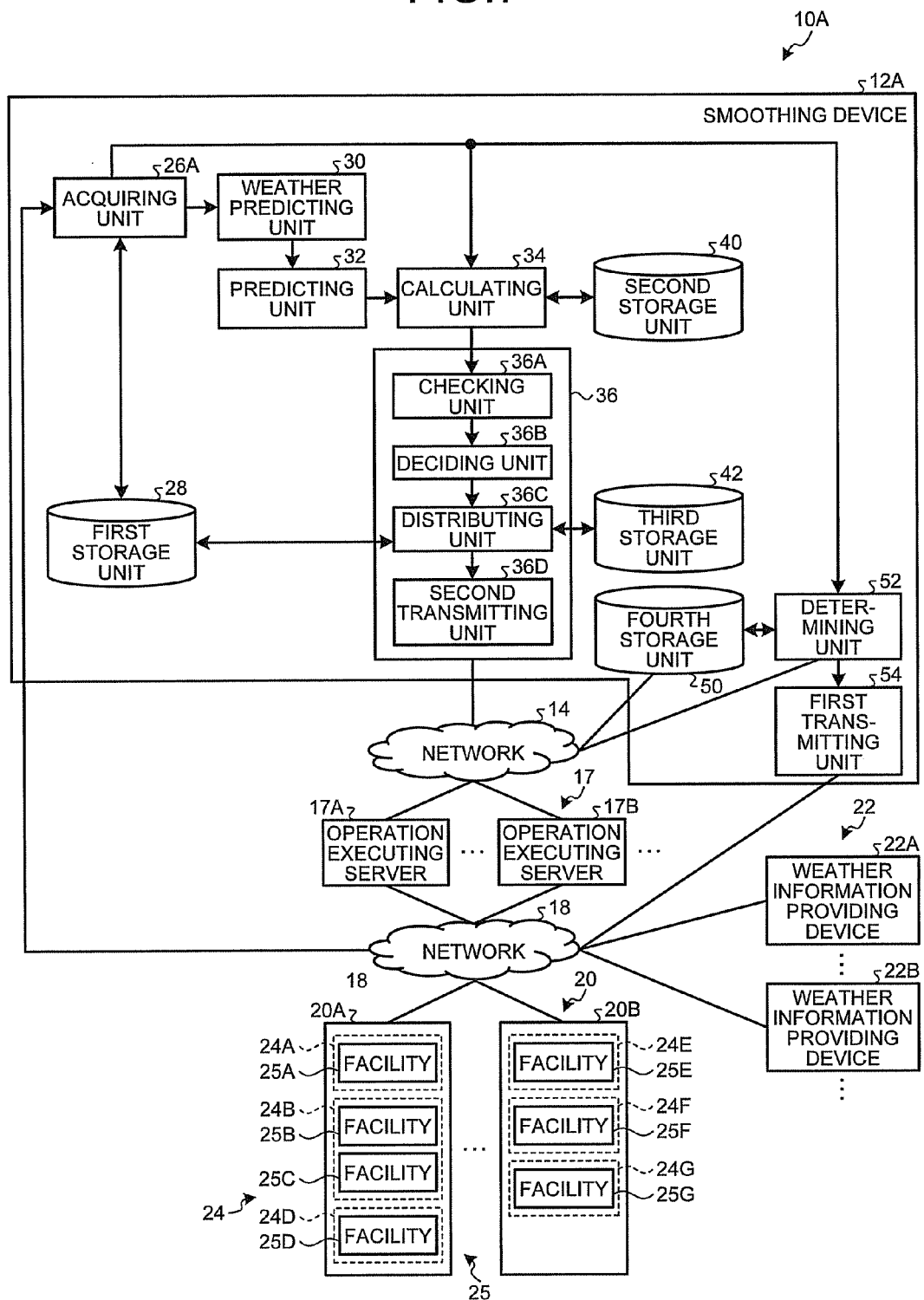
FIG. 7 is a diagram illustrating a smoothing system according to a second embodiment.

FIG. 7 is a diagram illustrating a smoothing system 10A according to the present embodiment. Functions and components that are the same as those in the first embodiment will be designated by the same reference numerals and detailed description thereof will not be repeated. As illustrated in FIG. 7, the smoothing system 10A includes a smoothing device 12A, operation executing servers 17, the weather information providing devices 22 and the facility devices 25. The smoothing device 12A and the operation executing servers 17 are connected via a network 14. The operation executing servers 17 and the facility devices 25 are connected via the network 18. The weather information providing devices 22, the facility devices 25 and the smoothing device 12A are also connected via the network 18.

The operation executing servers 17 include a plurality of operation executing servers 17A and 17B. The operation executing servers 17A and 17B will be collectively referred to as the operation executing servers 17. The operation executing servers 17 each include the receiving unit 19A, the calculating unit 19B and the output unit 19C similarly to the operation executing servers 16 (not illustrated in FIG. 7; see FIG. 3). The operation executing servers 17 executes operation of control values similarly to the operation executing servers 16. Unlike the operation executing servers 16, the operation executing servers 17 transmits the control values resulting from the operation to the smoothing device 12A instead of immediately transmitting the control values to the associated facility devices 25.

The smoothing device 12A includes an acquiring unit 26A, the first storage unit 28, the weather predicting unit 30, the predicting unit 32, the calculating unit 34, the control unit 36, the checking unit 36A, the deciding unit 36B, the distributing unit 36C, the second transmitting unit 36D, the second storage unit 40, the third storage unit 42, a fourth storage unit 50, a determining unit 52 and a first transmitting unit 54. The acquiring unit 26A acquires weather information from the weather information providing devices 22 similarly to the acquiring unit 26. Note that the acquiring unit 26A transmits the weather information to the weather predicting unit 30 and the determining unit 52.

The fourth storage unit 50 is a storage medium such as a hard disk drive (HDD). The fourth storage unit 50 stores information on control values resulting from operation in advance by the operation executing servers 17. FIG. 8 is a table illustrating an example of a data structure of the information stored in the fourth storage unit 50. As illustrated in FIG. 8, the fourth storage unit 50 stores operation executing time at which operation of control values is executed by the operation executing servers 17, weather prediction information used for the operation, the control values obtained as a result of the operation, facility information on the facility devices 25 to be controlled and original operation executing time in association with one another.

The facility information is information that identifies the facility device 25 and contains a facility ID that uniquely identifies the facility device 25, and an operation area ID that uniquely identifies the operation area 24 in which the facility device 25 is installed.

The operation executing time refers to time at which the operation executing servers 17 execute operation, that is, an earlier operation time slot to which the operation is rescheduled. The original operation executing time refers to time at which the operation of the control values is originally scheduled, that is, the original operation time slot before rescheduling. In other words, the original operation executing time is an operation time slot that is determined by the predicting unit 32 that changes in the weather are large in the operation areas 24 in which the facility devices 25 identified by the associated facility information are installed at the operation time slot.

The determining unit 52 determines whether or not to execute again operation of control values that have reached at the original operation executing time. More specifically, the determining unit 52 determines that the weather prediction was wrong when a difference between the weather prediction information used for the operation and the actual current weather information exceeds a threshold T3, and determines to execute the operation again. The threshold T3 may be a value set in advance to be used for determining whether weather prediction is wrong. The difference between the weather prediction information and the weather information can be obtained by calculating a difference between a value representing the weather indicated by the weather prediction information and a value representing the weather indicated by the weather information. A value representing the weather is a value indicated by the weather information and the weather prediction information and obtained by quantifying the temperature, the humidity, the wind speed and the like.

The first transmitting unit 54 transmits control values for which it is determined by the determining unit 52 that operation need not be executed again among control values with the operation executing time matching with the current time to the facility devices 25 identified by the associated facility information.

Figure 9:
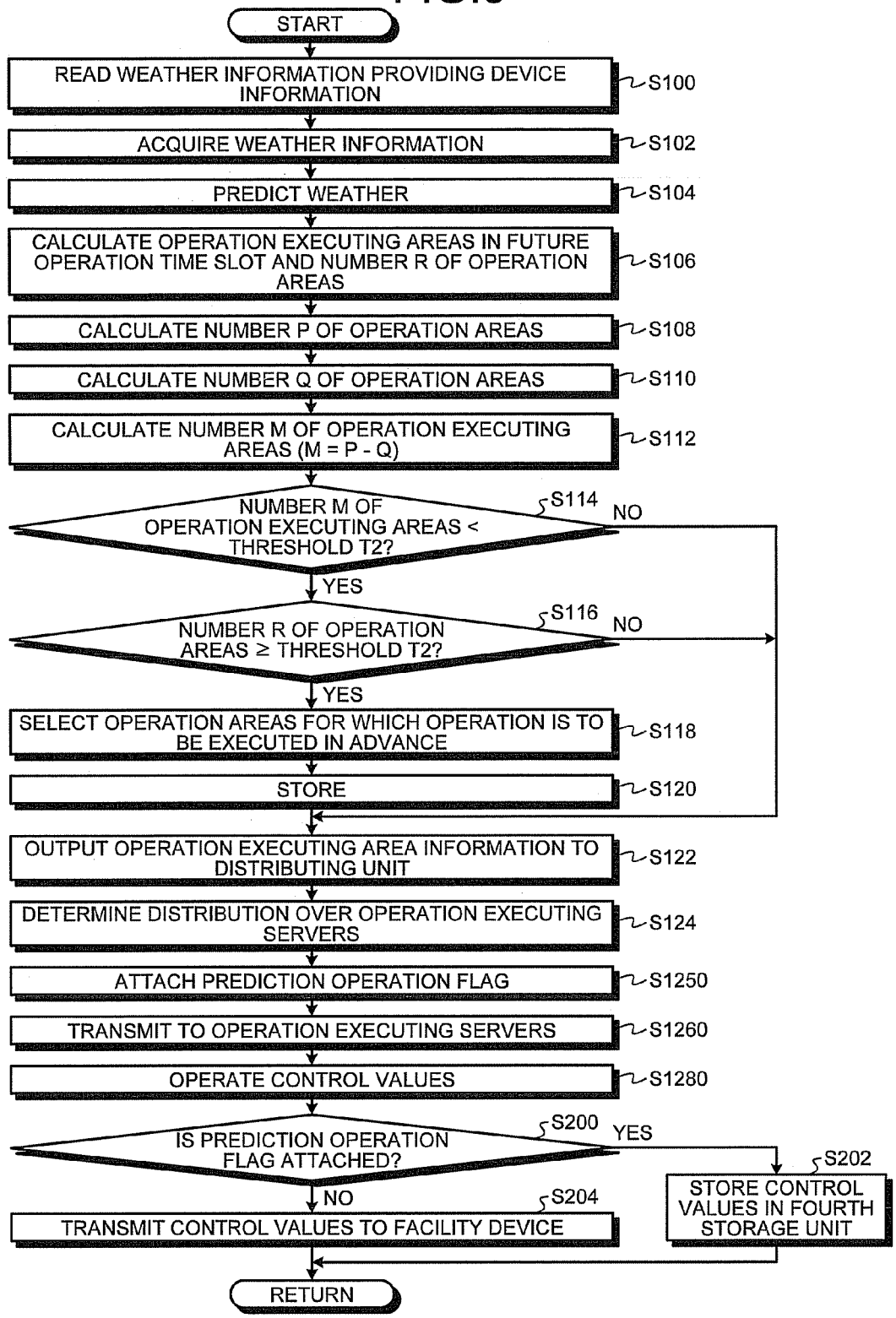
FIG. 9 is a flowchart illustrating procedures of a smoothing process according to the second embodiment.

Next, a smoothing process performed by the smoothing system 10A according to the present embodiment will be described. FIG. 9 is a flowchart illustrating procedures of the smoothing process according to the present embodiment.

First, the smoothing device 12A performs processes in steps S100 to S124 similarly to the first embodiment. Then, after performing the process in step S124, the process proceeds to step S1250.

In step S1250, the distributing unit 36C attaches a "predicted operation flag" to the information indicating the operation areas 24 for which operation is to be executed in advance selected in step S118 (step S1250).

Next, the second transmitting unit 36D transmits operation information containing: the information indicating the operation areas 24; weather prediction information (first information) at the future operation time slot or weather information (second information) at the current operation time slot associated with the information indicating the operation areas 24; facility information indicating the facility devices 25 to which control values are to be transmitted; time at which environmental control according to the control values is to be performed; and also the predicted operation flag, to the associated operation executing servers 17 determined by the distributing unit 36C based on the distribution result determined by the distributing unit 36C (step S1260).

The operation executing servers 17 that have received the operation information execute operation of control values on the basis of the received operation information (step S1280).

Next, the operation executing servers 17 determines whether or not a predicted operation flag is attached to the operation information received from the smoothing device 12A (step S200).

If the determination in step S200 is positive (Yes in step S200), the process proceeds to step S202. In step S202, the smoothing device 12A stores the control values obtained by the operation by the operation executing servers 17 in association with the associated facility information in the fourth storage unit 50 (step S202). The present routine is then terminated. More specifically, the output unit 19C of each operation executing server 17 transmits the control values obtained by the operation at the calculating unit 19B and the facility information of the facility devices 25 to which the control values are to be applied to the smoothing device 12A. The smoothing device 12A that has received the information stores the received control values and the facility information of the facility devices 25 to which the control values are to be applied in association with the operation executing time at which the operation executing servers 17 executed the operation of the control values, the weather prediction information used for the operation and the original operation executing time in the fourth storage unit 50.

If the determination in step S200 is negative (No in step S200), on the other hand, the process proceeds to step S204. In step S204, the operation executing servers 17 transmit the calculated control values to the associated facility devices 25 (step S204) and the present routine is terminated.

Figure 10:
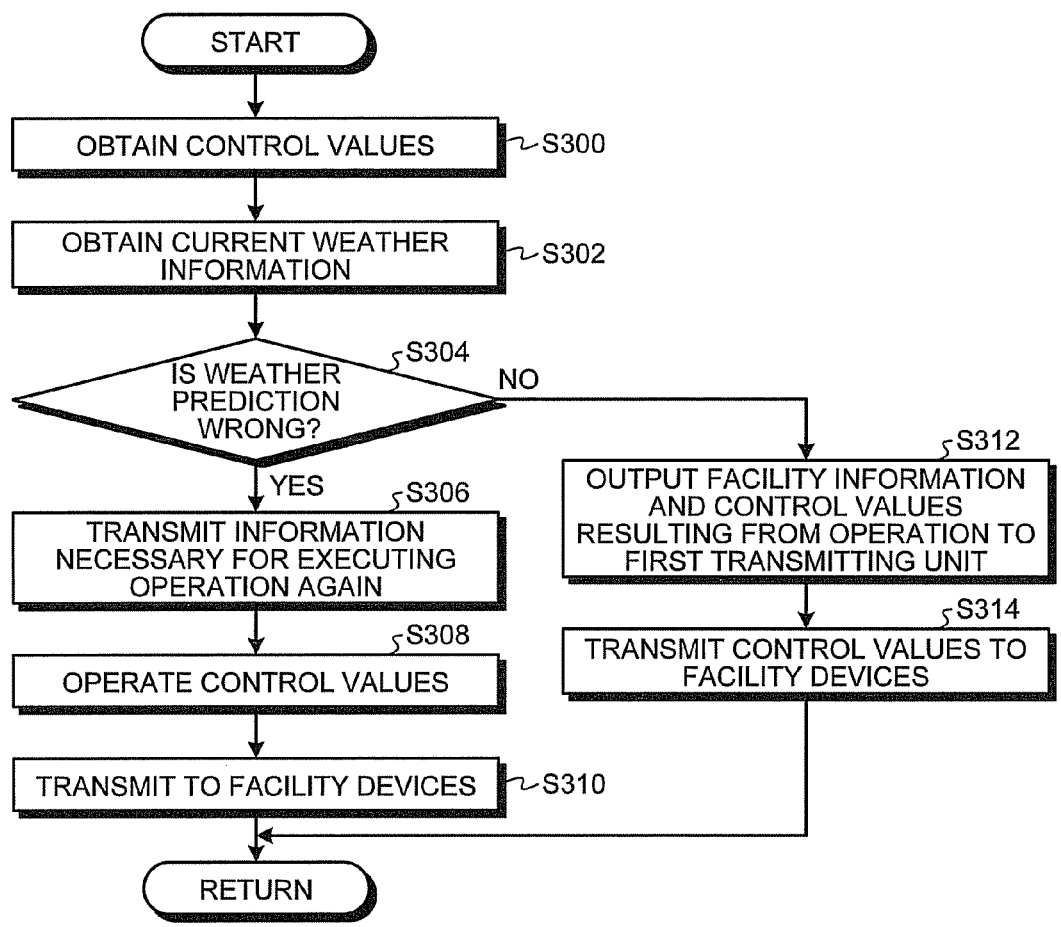
FIG. 10 is a flowchart illustrating an interrupt process according to the second embodiment.

Next, an interrupt process performed by the smoothing device 12A will be described. FIG. 10 is a flowchart illustrating the interrupt process performed by the smoothing device 12A during the smoothing process illustrated in FIG. 9. A case in which the smoothing device 12A performs the interrupt process illustrated in FIG. 10 every 10 minutes will be described in the present embodiment. Note that the intervals at which the interrupt process is performed are not limited to 10 minutes.

First, the determining unit 52 refers to the fourth storage unit 50 to obtain control values with original operation executing time matching with the current time (step S300). Next, the determining unit 52 obtains current weather information from the acquiring unit 26A (step S302).

The determining unit 52 then determines whether or not weather prediction predicted by the weather predicting unit 30 is wrong (step S304). If the determination in step S304 is positive (Yes in step S304), the process proceeds to step S306.

In step S306, operation information (third information) containing current weather information that is necessary for executing operation of control values again to the operation executing servers 17 (step S306). Note that the operation information transmitted to the operation executing servers 17 in step S306 does not contain the predicted operation flag. The operation executing servers 17 to which the operation information is to be transmitted in step S306 may be selected randomly or may be selected according to an order from a plurality of operation executing servers 17.

The operation executing servers 17 that have received the operation information execute operation of control values again on the basis of the received operation information (step S308). The operation executing servers 17 then transmit calculated control values to the associated facility devices 25 (step S310) and the present routine is terminated.

If the determination in step S304 is negative (No in step S304), on the other hand, the process proceeds to step S312 because the operation need not be executed again when the weather prediction is not wrong. In step S312, the control values read from the fourth storage unit 50 in step S300 and the facility information are output to the first transmitting unit 54 (step S312).

The first transmitting unit 54 that has received the control values and the facility information transmits the received control values to the facility devices 25 indicated by the facility information (step S314), and the present routine is terminated.

As described above, in the present embodiment, the control values obtained by the operation executed in advance by the operation executing servers 17 are stored at the smoothing device 12A. Then, when the time at which environmental control is to be performed using the control values is reached, it is determined whether or not the weather prediction information predicted at the operation of control values is wrong. If the weather prediction information is wrong, the operation executing servers 17 execute operation of control values again on the basis of the current weather information and transmit the control values resulting from the operation to the associated facility devices 25. If the weather prediction information is not wrong, on the other hand, the control values associated with the current time that are already obtained by the operation are transmitted to the associated facility devices 25.

With the smoothing system 10A according to the present embodiment, therefore, environmental control using control values that are greatly different from control values that should have been used can be prevented when the weather prediction was wrong. Thus, with the smoothing system 10A according to the present embodiment, an effect that control values based on weather information can be transmitted to the facility devices 25 is produced in addition to the accurate smoothing according to the first embodiment. Moreover, energy can further be saved.

In the smoothing device 12A, the value of the threshold T2 for determining whether the weather prediction was wrong may be set to become smaller as the number of times the weather prediction was wrong increases when it is determined that the weather prediction was wrong more than a predetermined number of times within a predetermined period. In this manner, it is possible to prevent the calculation load from increasing owing to repeated operations as a result of weather prediction being frequently wrong. Alternatively, in the smoothing device 12A, the range of operation areas 24 subjected to the prediction by the predicting unit 32 may be set to become smaller as the number of times the weather prediction was wrong increases when it is determined that the weather prediction was wrong more than a predetermined number of times within a predetermined period.

Programs for performing each of the smoothing process and the interrupt process to be executed by the smoothing device 12 and the smoothing device 12A according to the first and second embodiments are embedded in a ROM or the like in advance and provided therefrom.

Alternatively, the programs for performing each of the smoothing process and the interrupt process to be executed by the smoothing device 12 and the smoothing device 12A according to the first and second embodiments may be recorded on a computer readable recording medium such as a CD-ROM, a flexible disk (FD), a CD-R and a digital versatile disk (DVD) in a form of a file that can be installed or executed, and provided therefrom.

Still alternatively, the programs for performing each of the smoothing process and the interrupt process to be executed by the smoothing device 12 and the smoothing device 12A according to the first and second embodiments may be stored on a computer system connected to a network such as the Internet, and provided by being downloaded via the network. Still alternatively, the programs for performing each of the smoothing process and the interrupt process to be executed by the smoothing device 12 and the smoothing device 12A according to the first and second embodiments may be provided or distributed through a network such as the Internet.

The programs for performing each of the smoothing process and the interrupt process to be executed by the smoothing device 12 and the smoothing device 12A according to the first and second embodiments have modular structures including the respective units (the acquiring unit 26, the acquiring unit 26A, the first storage unit 28, the weather predicting unit 30, the predicting unit 32, the calculating unit 34, the control unit 36, the checking unit 36A, the deciding unit 36B, the distributing unit 36C, the second transmitting unit 36D, the second storage unit 40, the third storage unit 42, the fourth storage unit 50, the determining unit 52 and the first transmitting unit 54) described above. In an actual hardware configuration, a CPU (processor) reads the programs from the ROM mentioned above and executes the programs, whereby the respective units are loaded on a main storage device and generated thereon.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A smoothing device comprising:
    a predicting unit configured to calculate, among a plurality of operation areas in which facility devices that perform environmental control according to control values are installed, the number of operation areas in which a change in a weather represented by weather prediction information at a first time slot is larger than a threshold and predict a calculation load of operation at the first time slot;
    a calculating unit configured to calculate, among the plurality of the operation areas, the number of operation areas in which a change in a weather represented by weather information at a second time slot earlier than the first time slot is larger than the threshold, subtract the number of operation-executed operation areas from the number of the operation areas, and calculate a calculation load of operation at the second time slot; and
    a control unit configured to control an executing device that executes the operation so that part of the operation to be executed at the first time slot is executed at the second time slot when the calculation load at the second time slot is smaller than a first threshold and the calculation load at the first time slot is equal to or larger than the first threshold, wherein
    the control unit comprises:
        a checking unit configured to determine whether or not the calculation load at the second time slot is smaller than the first threshold and determine whether or not the calculation load at the first time slot is equal to or larger than the first threshold;
        a deciding unit configured to determine part of the operation to be executed at the first time slot as first operation to be executed at the second time slot when the calculation load at the second time slot is smaller than the first threshold and the calculation load at the first time slot is equal to or larger than the first threshold; and
        a second transmitting unit configured to transmit, at the second time slot, second information containing the weather information at the second time slot and first information containing the weather prediction information at the first time slot to the executing device that executes the operation.

2. The device according to claim 1, further comprising:
a storage unit configured to store the control values resulting from the operation executed by the executing device, an operation executing time of the control values, and an original operation executing time at which the operation of the control values is scheduled in association with one another; and
a first transmitting unit configured to transmit a control value with the original operation executing time that matches with current time among the control values stored in the storage unit to the corresponding facility device.

3. The device according to claim 2, further comprising a determining unit that determines whether or not the weather prediction information matches with actual weather information at the first slot when current time reaches the first time slot, wherein
the first transmitting unit transmits third information containing the actual weather information at the first time slot to the executing device that executes the operation when the weather prediction information does not match with the actual weather information at the first time slot.

4. A computer program product comprising a non-transitory computer-readable medium storing a smoothing program executed by a computer, the program causing the computer to execute:
calculating, among a plurality of operation areas in which facility devices that perform environmental control according to control values are installed, the number of operation areas in which a change in a weather represented by weather prediction information and a first time slot is larger than a threshold and predicting a calculation load of operation at the first time slot;
calculating, among the plurality of the operation areas, the number of operation areas in which a change in a weather represented by weather information at a second time slot earlier than the first time slot is larger than the threshold, subtracting the number of operation-executed operation areas from the number of the operation areas, and calculating a calculation load of operation at the second time slot; and
controlling an executing device that executes the operation so that of the operation to be executed at the first time slot is executed at the second time slot when the calculation load at the second time slot is smaller than a first threshold and the calculation load at the first time slot is equal to or larger than the first threshold, wherein
the controlling unit includes:
determining whether or not the calculation load at the second time slot is smaller than the first threshold and determining whether or not the calculation load at the first time slot is equal to or larger than the first threshold;
determining part of the operation to be executed at the first time slot as first operation to be executed at the second time slot when the calculation load at the second time slot is smaller than the first threshold and the calculation load at the first time slot is equal to or larger than the first threshold; and
transmitting, at the second time slot, second information containing the weather information at the second time slot and first information containing the weather prediction information at the first time slot to the executing device that executes the operation.

5. A smoothing system comprising:
a smoothing device;
an executing device connected to the smoothing device; and
facility devices connected to the executing device, wherein
the smoothing device comprises:
a predicting unit configured to calculate, among a plurality of operation areas in which the facility devices that perform environmental control according to control values are installed, the number of operation areas in which a change in a weather represented by weather prediction information at a first time slot is larger than a threshold and predict a calculation load of operation at the first time slot;
a calculating unit configured to calculate, among the plurality of the operation areas, the number of operation areas in which a change in a weather represented by weather information at a second time slot earlier than the first time slot is larger than the threshold, subtract the number of operation-executed operation areas from the number of the operation areas, and calculate a calculation load of operation at the second time slot;
a checking unit configured to determine whether or not the calculation load at the second time slot is smaller than a first threshold and determine whether or not calculation load at the time slot is equal to or larger than the first threshold;
a deciding unit configured to determine part the operation to be executed at the first time slot as first operation to be executed at the second time slot when the calculation load at the second time slot is smaller than the first threshold and the calculation load at the first time slot is equal to or larger than the first threshold; and
a first transmitting unit configured to transmit, at the second time slot, second information containing the weather information at the second time slot and first information containing the weather prediction information at the first time slot to the executing device that executes the operation, wherein
the checking unit is further configured to determine whether or not the calculation load at the second time slot is smaller than the first threshold and determine whether or not the calculation load at the first time slot is equal to or larger than the first threshold, and
the deciding unit is further configured to determine part of the operation to be executed at the first time slot as first operation to be executed at the second time slot when the calculation load at the second time slot is smaller than the first threshold and the calculation load at the first time slot is equal to or larger than the first threshold, wherein
the smoothing device further comprises:
a second transmitting unit configured to transmit, at the second time slot, the second information containing the weather information at the second time slot and the first information containing the weather prediction information at the first time slot to the executing device that executes the operation,
the executing device comprises:
a receiving unit configured to receive the first information and the second information;
a calculating unit configured to execute the operation on a basis of the first information and the second information to calculate the control values to be used at the facility devices installed in the operation areas; and an output unit configured to output the control values to associated facility devices installed in the operation areas, and the facility devices control environment of the operation areas in which the facility devices are installed according to the control values.

\* \* \* \* \*